(12) United States Patent
Fogerlie

(10) Patent No.: US 6,948,826 B2
(45) Date of Patent: Sep. 27, 2005

(54) LIGHT BOX HAVING A SOLAR PANEL COVER

(76) Inventor: Sivert G. Fogerlie, 4637 W. Parkview Cir., Glendale, AZ (US) 85310

(*) Notice: Subject to any disclaimer, the term of this patent is extended or adjusted under 35 U.S.C. 154(b) by 24 days.

(21) Appl. No.: 10/774,921

(22) Filed: Feb. 9, 2004

(65) Prior Publication Data

US 2005/0174762 A1 Aug. 11, 2005

(51) Int. Cl.[7] .............................. F21L 7/00; F21L 13/00
(52) U.S. Cl. ...................... 362/183; 362/253; 362/267; 362/276; 362/294; 362/373; 362/310; 362/8; 320/2; 126/704
(58) Field of Search ................................ 362/253, 183, 362/267, 276, 8, 9, 294, 310, 373; 320/2; 126/704

(56) References Cited

U.S. PATENT DOCUMENTS

| | | | | |
|---|---|---|---|---|
| 4,772,990 A | * | 9/1988 | Linehan et al. ............. | 362/183 |
| 4,989,124 A | * | 1/1991 | Shappell .................... | 362/183 |
| 5,377,076 A | * | 12/1994 | Wen ........................... | 361/679 |
| 6,305,185 B1 | * | 10/2001 | Sloan ......................... | 62/457.7 |
| 6,339,188 B1 | * | 1/2002 | Voelkner .................... | 136/251 |

* cited by examiner

*Primary Examiner*—Thomas M. Sember
*Assistant Examiner*—James W Cranson, Jr.
(74) *Attorney, Agent, or Firm*—The Hill Law Firm, PLC; Scott A. Hill

(57) ABSTRACT

The present solar light assembly uses a unique solar light box that has an upper step which visually frames a lower step. The lower step has a deep cavity that houses most of the components of the solar light assembly, such as an LED light source and a 12 volt battery. The lower step is completely covered by a solar panel which functions as a lid in addition to gathering energy that is stored in the battery. The upper step conceals the solar panel from view by a passerby. There is a rain barrier ridge substantially around an opening to the lower step's deep cavity to prevent water that may collect in the upper step from entering the deep cavity. The solar light box is large enough to house additional components, such as a motion sensor or a camera. In the preferred use of the solar light assembly, the solar light box is mounted to a pole that extends over the top of a cluster box unit.

16 Claims, 3 Drawing Sheets

LIGHT BOX HAVING A SOLAR PANEL COVER

BACKGROUND OF THE INVENTION

Solar panels are frequently used to recharge batteries that power lights at night. Solar powered lights can be observed on walkways (U.S. Pat. No. 5,055,984), mail boxes (U.S. Pat. No. 6,629,766), light poles (U.S. Pat. Nos. 6,060,658, 5,149,188, 4,281,369 and 4,200,904), construction lights (U.S. Pat. No. 4,884,017), or even mounted under the eaves of a building as a security light (U.S. Pat. No. 5,217,296). Interest in solar powered lighting has been fueled by recent advances in white LED technology because the power consumption is lower for the same light output, but the use of LED's has increased the expected light output more than it has decreased the size of the solar panels. Unfortunately, larger solar panels used with bright LED lights are frequently targeted by vandals or thieves because the solar panels are easy to spot and are usually located somewhere that is relatively remote, not to mention that the solar panels are expensive. Additionally, very few people find a large, flat solar panel that is tilted towards the sun to be aesthetically pleasing.

An important example of an unmet need for lighting is the area surrounding a cluster box unit (CBU). It is not at all uncommon for there to be no power available for lighting these public areas which are visited by many people every evening when they collect their mail. The housing developers failed to run any sort of community power to these CBUs, and it is difficult to persuade the local government to add a street light over one of these public areas, despite the significant safety concerns. Even though solar powered lighting seems like a clear alternative to address these needs, the prior art has not satisfactorily provided a good choice for those consumers that want an attractive lighting assembly that is not likely to be stolen, and that requires very little maintenance. There is a clear need for an affordable and easy to install solar powered light assembly for areas that are either remote or otherwise are difficult to power.

SUMMARY OF THE INVENTION

The present invention is a solar powered light assembly that conceals the use of a solar panel such that the assembly presents as a common street light. At first glance, the solar powered light assembly appears to be a common street light, similar to those frequently used in a parking lot or along a walkway, so most people are very accepting of the unusually large assembly in comparison to the light output, as compared to a common street light. The acceptance of the size of the solar powered light assembly is a matter of perception. The unique design of the solar light box used with the solar powered light assembly has two steps, an upper step and a lower step. The upper step is wider and longer than the lower step, but it is not as deep as the lower step. The upper step is used to support and conceal a solar panel. The lower step is used to support and protect the light source, batteries and any electronics needed for a particular solar powered light assembly. Most people find the solar powered light assembly to be quite aesthetically pleasing because the top step is set back, so it is less imposing, and the top step appears to nicely frame the smaller bottom step much in the way that a large picture frame is used to give a relatively small print a more substantial appearance.

An additional benefit of the present invention is that the solar panel itself may be used as a protective cover, or lid, for the lower step of the solar light box which contains the weather-sensitive components of the solar powered light assembly. To reduce costs and to more effectively prevent the ingress of water and debris into the lower step of the solar light box, the most preferred embodiment includes a rain barrier ridge where the upper and lower steps of the solar light box meet. The upper and lower steps are also preferably made from a sheet of plastic that is molded, such as by thermoforming, into a single piece part that is durable and aesthetically pleasing.

Figure 1:
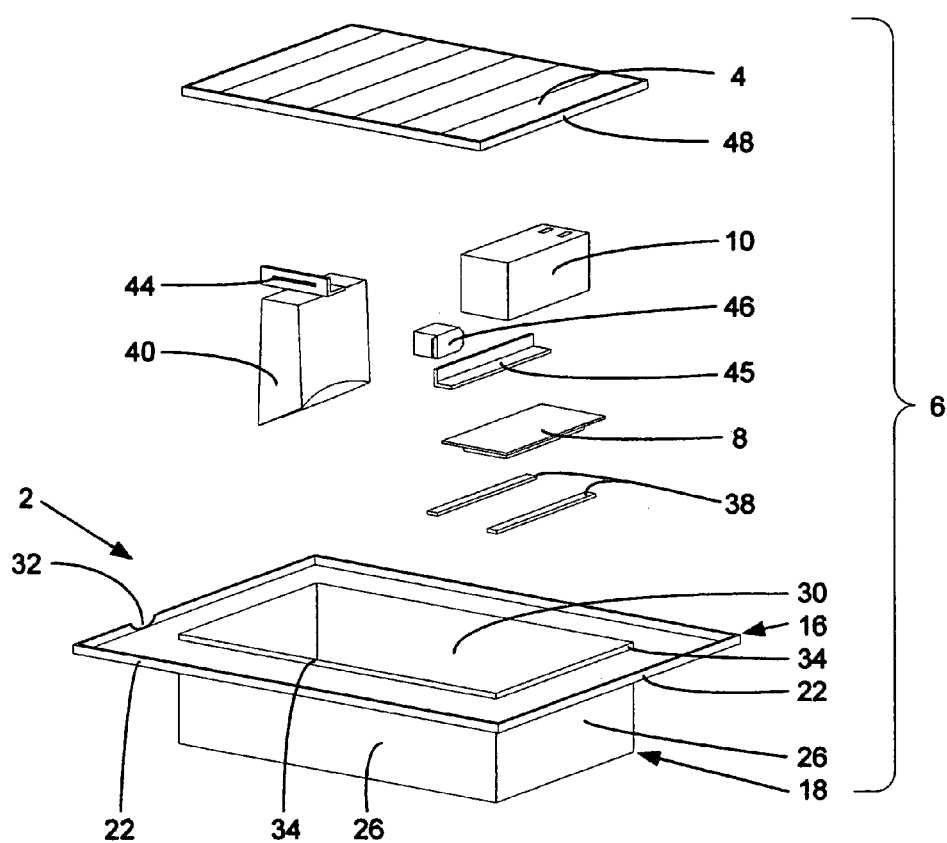
FIG. 1 is an exploded view of a solar powered light assembly of the present invention that uses a motion sensor.

The following is the list of numerical callouts used in FIGS. 1–6:

2 solar light box
4 solar panel
6 solar powered light assembly
8 light source
10 rechargeable battery
12 CBU
14 light pole
16 upper step
18 lower step
20 upper step's face
22 upper step's sides
24 lower step's face
26 lower step's sides
28 opening
30 deep cavity
32 drainage passageway
34 rain barrier ridge
36 light aperture
38 standoffs
40 sensor
42 sensor aperture
44 sensor bracket
45 battery bracket
46 charge controller
48 panel frame
50 mounting hoop
52 deep groove

DETAILED DESCRIPTION OF THE INVENTION

Figure 2:
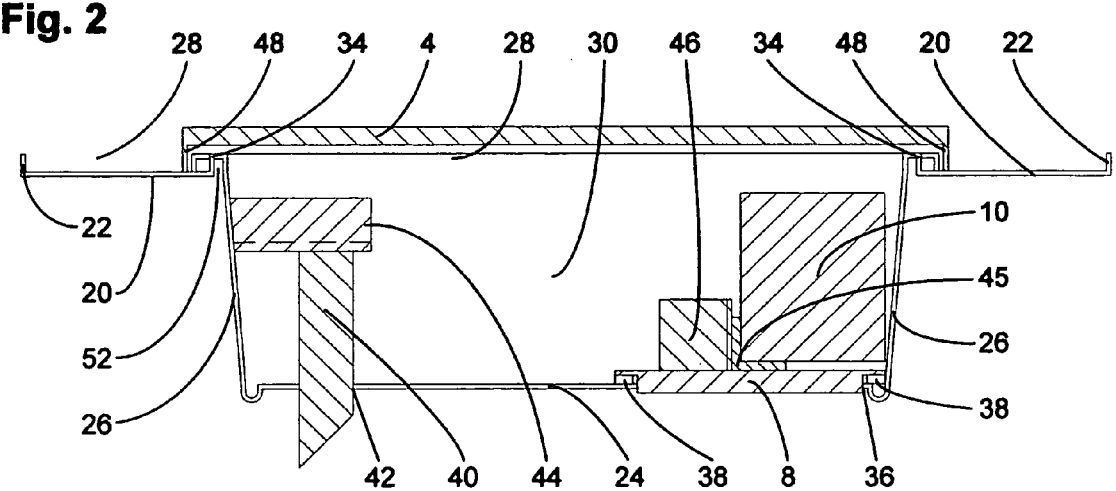
FIG. 2 is a cross section through the middle length, taken vertically, of the solar powered light assembly of FIG. 2.
Figure 5:
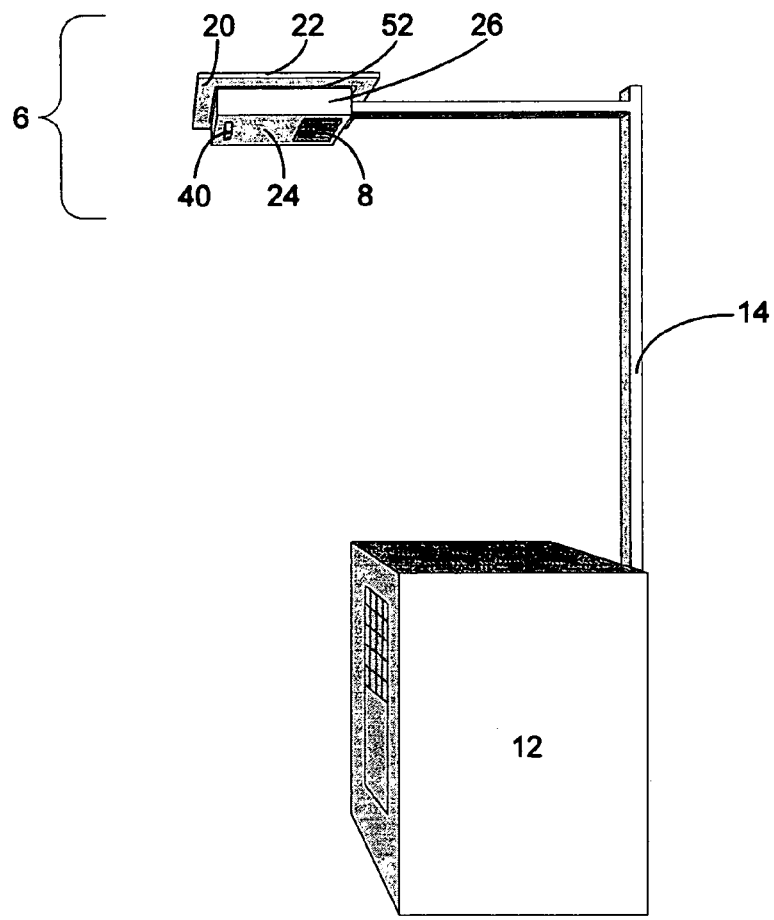
FIG. 5 is a perspective view of a light pole supporting a solar powered light assembly of the present invention which is used to illuminate a cluster box unit (CBU).
Figure 6:
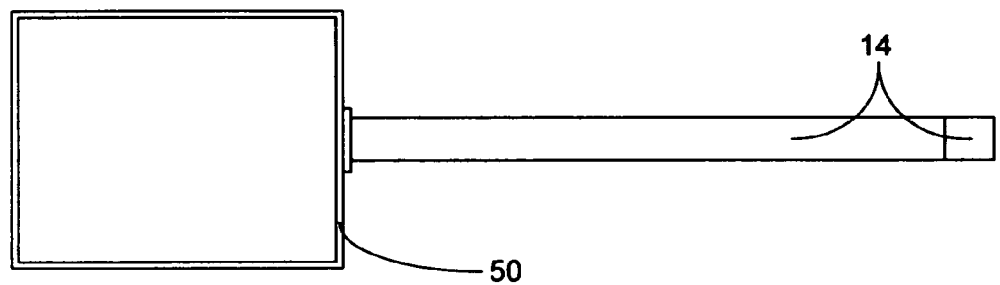
FIG. 6 is a plan view of a hoop support used to attach the solar powered light assembly to a light pole.

The focus of the present invention is primarily on the solar light box 2 that conceals the use of a solar panel 4, as seen in FIGS. 1, 2 and 5, but the following description will show how to make an entire solar powered light assembly that is considered to be the best balance of cost and usefulness. The major parts of the solar powered light assembly 6 are the solar light box 2, light source 8, rechargeable battery 10, solar panel 4, and a support structure. These major parts, which will be described in the order just mentioned, are combined to bring the solar powered light assembly together into a low maintenance outdoor lighting solution. Wiring is not shown. The most preferred use of the solar powered light assembly of the present invention is over a cluster box unit (CBU) 12, as shown in FIG. 5, with the light pole 14 being directly attached to the back of the CBU. Additional or alternate features that make the solar powered light assembly more versatile or easier to install will be discussed throughout this description. Where reference numbers in one figure are the same as another figure, those reference numbers carry substantially the same meaning. Preferred sizes, materials and methods of attachment will be discussed, but these preferences are not intended to exclude other suitable or functionally equivalent sizes, materials or methods of attachment.

The solar light box 2 of the present invention is made from a durable and rigid material that may be stamped, injection molded, or otherwise formed. Suitable materials include plastic, aluminum, steel, polyester, fiberglass, nylon, vinyl, carbon fiber materials, polycarbonate, or other composite materials that are substantially impervious to fracturing. There must be enough rigidity in the material so that an installed solar light box maintains its shape and undergoes only minimal flexing, even in the event that a heavy snowfall covers the solar light box. The most preferred method of making the solar light box is by thermoforming it from a single sheet of ABS plastic or polycarbonate. The thickness of the sheet will usually be between about five and ten millimeters, but will depend upon the material that is used and the overall size of the solar light box. If a weak or thin material is used to form the solar light box, a separate support structure could be used inside the solar light box to bear the weight of any loads, such as snow or batteries, that are on or in the solar light box.

The body of the solar light box 2 is dominated by two structures, an upper step 16 and a lower step 18. The upper step has a face 20 and sides 22, and the lower step has a face 24 and sides 26. Most preferably, the two steps are formed into a single part such that the lower step's sides integrally meet with the upper step's face. A formed solar light box, which has two steps and is open, has an exposed interior when viewed from the top. When viewed from the bottom, which is the orientation that would normally be seen by someone walking under the solar powered light assembly 6, the upper step's face substantially frames the lower step. Because the lower step is projecting from the upper face, at least from the viewpoint of someone walking under the solar powered light assembly, the upper step seems smaller and less imposing, so the overall size of the solar light box seems appropriate for the amount of light that is provided.

When the solar light box 2 is viewed from the top, the upper step's face 20 is the bottom of a broad and shallow opening 28, except where the opening drops into a deep cavity 30 defined by the lower step 18. The upper step's sides 22 can be very short, preferably only a couple of centimeters high. Although the upper step's face could only slightly frame the lower step, it is preferable to use an upper step 16 having a face that contains at least as much surface area as the lower step's face 24, thereby creating a fairly wide border that frames the lower step. For example, if a lower step's face measures 25 cm by 40 cm (area of 1000 cm$^2$), then the upper step's face is preferably a border that is at least 7 cm wide. For this example, the overall size of the upper step's face should be at least 39 cm by 54 cm, less the 1000 cm$^2$ area of the lower step that is being framed.

Additionally, the sides of the lower step do not need to be perpendicular to the faces, so a more aesthetically pleasing slope can be designed into the lower step's sides 26. Sloped sides will contribute to the broadest dimensions of the upper step's face, which means that an even larger solar panel 4 can be hidden from view without negatively affecting the perception about the size of the solar light box.

Figure 4:
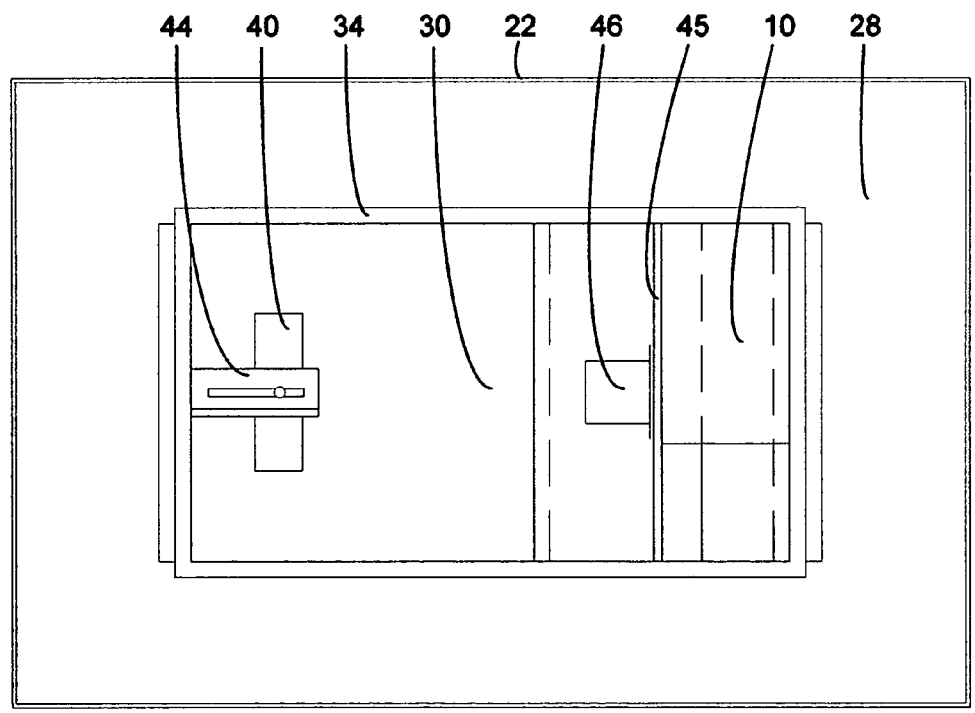
FIG. 4 is a plan view of the solar powered light assembly of FIG. 2, except the solar panel has not yet been placed as a cover over the solar light box.

The top of the solar light box 2 is open, so it will catch falling rain and snow unless covered. The cover to the solar light box will be the solar panel 4, as will be described later, but the upper step's sides 22 are intended to conceal the solar panel. This means that the solar panel cannot overlap the entire solar light box. The upper step 16 is designed so that it can be covered with water, but the water will flow to at least one drainage passageway 32 through the upper step, preferably through a side. A rain barrier ridge 34, formed substantially near where the opening 28 drops into the lower step's deep cavity 30, prevents water from flowing into the lower step 18. For the preferred one piece solar light box construction, the rain barrier ridge is formed at the same time as the rest of the solar light box by extending the lower step's sides 26 above a plane defined by the upper step's face 20. There must be sufficient material available to form the rain barrier ridge feature when the method of making the solar light box is by thermoforming, so the rain barrier ridge should be broadened, as shown in FIGS. 1,2 and 4.

The whole purpose of the solar light box 2 is, of course, to power and support a light source 8. The preferred light source is an array of bright white light emitting diodes (LEDs) that are sealed into a weatherproof acrylic brick assembly. For a given amount of energy, the light output of LEDs is considerably greater than that produced by incandescent bulbs. LEDs are even more energy efficient than compact fluorescent lights, and LEDs last for many more years without the flickering or delay that is common with cold fluorescent lights. A 36 LED brick light is ideally suited for this application because it provides a uniform dispersion of light that is adequate for most uses. The LED brick light is mounted into a light aperture 36 that is cut or otherwise formed in the lower step's face 24. The light aperture can include standoffs 38 or shims that support the light source in a recessed position such that the light source is mounted only partially in the light aperture.

Alternatively, a few very bright white LED bulbs may be positioned inside light apertures that are on the face of the lower step. The lower step's face 24 may have a small area that is recessed back into the lower step 18 such that the LED bulbs can be mounted to the lower step, but there would still be room to place a diffuser, such as a translucent lens, over the recessed area so that the intensity of the bulbs is softened and more uniformly dispersed while providing some protection for the bulbs. Then again, if desired, the light aperture may simply support a light socket that holds an incandescent or fluorescent bulb that may be recessed into the lower step's face.

In conjunction with using an energy efficient light source 8, an energy-conserving switch, preferably a motion sensor 40, should be used with the solar powered light assembly 6. Examples of energy-conserving switches include motion sensors, dusk-to-dawn photo-electric sensors, timers, remote controls, and combinations of the switches just mentioned. Probably the most popular and useful of the switches are motion sensors that have a timer. Motion sensors need to be capable of "seeing" the surroundings, so the sensor should be mounted to the lower step's face 24. Preferably, the sensor is partially recessed into a sensor aperture 42 and the sensor is secured inside the lower step 18 to a sensor bracket 44 that allows the sensor to be adjusted for a desired sensitivity and coverage area. The sensor is electrically connected between the light source and a rechargeable battery 10.

A rechargeable battery 10 is the power supply for the light. Most solar panels that could be used with the solar light box 2 are designed for 12 volt systems, so a 12 volt battery should be used. A 5 Amp hour sealed maintenance-free lead-acid battery would be suitable for light duty applications. For brighter lights that are used more frequently, or for dusk-to-dawn systems, a 20 Amp hour or larger battery may be needed. It should be noted that the batteries are heavy, large, and are solely recharged by the solar panel. The rechargeable battery is preferably just mounted in the lower step 18 of the solar light box, such as by setting it over the top of the LED brick light. A battery bracket 45 can be used to prevent the battery from sliding around, but it is not normally necessary to secure the battery. Because of the weight of the rechargeable battery, it should be mounted within the solar light box so that it puts minimal strain on the box, such as by transferring the weight of the rechargeable battery to a support structure. Alternatively, the batteries may be stored in a remote location, such as underground or in a CBU 12. For remote storage of the battery, wiring may be run through the interior of a light pole 14. Storing the battery in a remote location provides the added benefits of insulating the battery, which results in longer life, and possibly easier access for maintenance or replacement.

A charge controller 46 should be electrically connected between the rechargeable battery 10 and the solar panel 4. A charge controller with a built in low voltage disconnect device will protect the battery from excessive charge or discharge. Morningstar Corporation, Washington Crossing, Pa., offers simple 12 volt charge controllers, such as their SunGuard™ models, which are ideally suited for the solar light box application. The charge controller may be housed inside the lower step 18, and it will be protected by the solar panel that covers the deep cavity 30 of the solar light box 2.

Figure 3:
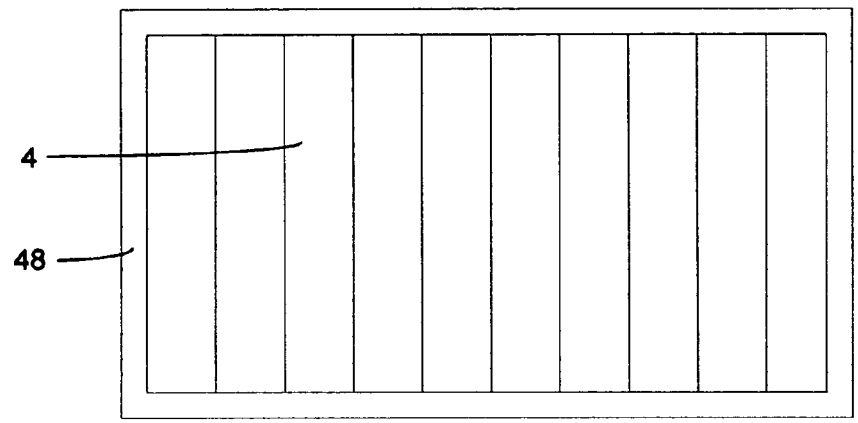
FIG. 3 is a plan view of the solar panel used with the solar powered light assembly of FIG. 2.

There are numerous solar panels that could be used with the solar light box 2 of the present invention, but the preferred solar panel 4 is one that is substantially impervious to harsh conditions. The preferred solar panel, shown in FIG. 3, is a flat panel that is formed in layers such that an array of solar cells are encased in a durable transparent material, such as the 11 watt Uni-Solar® solar panel designed for use with 12 volt systems and available from United Solar Systems Corp., Troy, Mich. The solar panel's outermost edges are protected by a panel frame 48, which may also be used to support the solar panel. The back of the solar panel has electrical leads which carry the potential gathered by the front of the solar panel. These electrical leads are connected to the charge controller 46. It is understood that it may be desirable to precisely size the length and width of the upper step 16 of a solar light box so that it exactly fits a particular solar panel. FIGS. 1 and 2 show a solar light box that is sized to accept numerous different solar panels such that the same solar light box may be used for many different applications.

The solar panel 4 is placed over the top of the lower step 18 until the solar panel is substantially lying inside the upper step 16, between the upper step's sides 22. The solar panel functions in its normal capacity to collect energy from the sun, but it also serves as a protective cover, or lid, for the lower step that holds most of the components of the solar powered light assembly 6. After the solar panel is placed as a cover over the lower step's deep cavity 30, a tamper-resistant means for securing the solar panel is attached to the solar light box 2. Tamper-resistant fasteners are probably the least expensive method for securing the solar panel. Additionally, one or more hinges may be used to attach one of the sides of the solar panel, such as along an edge of the panel frame 48, to the solar light box so that the solar panel may be flipped open, but not removed. The hinge feature will greatly reduce the risk of solar panel theft. A hinged solar panel should be secured, such as with a locking mechanism, at another position on the panel frame so that the contents of the solar light box are secured.

The solar light box 2 must also include a means for supporting the outdoor solar powered light assembly 6. A first method of supporting the solar light box is to simply bolt one of the sides of the lower step 18 to a substantially vertical plate attached to a light pole 14. A second method of mounting the solar light box involves cutting or forming at least two slots in one of the lower step's sides 26 so that a mounting fork with ends can slide into the solar light box. The fork ends can be fastened to the solar light box by simply bolting, or otherwise securing, the fork ends to the lower step's sides. If multiple holes are placed in the fork ends, the bolts can selectively be secured to those holes that provide the best alignment for the solar light box. A third method of mounting the solar light box involves forming a rigid mounting hoop 50, shown in FIG. 6, designed to nestle up into a deep groove 52 that is substantially integral to the rain barrier ridge 34 of a thermoformed solar light box. Fasteners should be used to secure the solar light box to the mounting hoop.

For added security, especially around CBUs, small holes formed in the lower step's sides 26 are used for displaying light emitting diodes. When the motion sensor 40 of the solar powered light assembly 6 is tripped, a signal is sent that causes the light emitting diodes to flash. Preferably, these light emitting diodes are amber or red. They are intended to catch the attention of nearby people, such as surrounding neighbors, so they look in the direction of the lighted area when the motion sensor is tripped.

The solar light box 2 may additionally include a camera aperture, preferably a punch-out that may optionally be removed, that is used if a camera is to be mounted to the lower step 18. The camera feature is powered by the rechargeable battery 10, and the images are stored in a recording device at a remote location, such as inside a CBU or at a nearby location that uses existing wireless technology. If the recording device is kept in a CBU, wires that carry power from the rechargeable battery, as well as the images from the camera, could be run through the light pole 14 into the CBU so any break-ins are recorded for later playback. The camera feature is intended to be a deterrent that may identify a suspect after a break-in, theft of mail, act of vandalism or assault.

While a preferred form of the invention has been shown and described, it will be realized that alterations and modifications may be made thereto without departing from the scope of the following claims. For example, the upper and lower steps could be formed as two separate parts that fit together in substantially the same way as the preferred embodiment, with the upper step resembling a tray. Also, the upper and lower faces could have different shapes than what is shown, such as ovals or hexagons, and decorative designs or additional steps could be added to the solar light box.

What is claimed is:
1. A solar light box comprising:
an upper step and a lower step, each step having a face and sides, the upper step substantially framing the lower step;

at least one light aperture in the lower step's face;

a light source mounted at least partially in the at least one light aperture;

a deep cavity in the lower step that is substantially defined by the lower step's face and sides;

a rain barrier ridge substantially around where an opening drops into the deep cavity;

at least one drainage passageway through the upper step; and a solar panel substantially lying inside the upper step, between the upper step's sides.

2. The solar light box of claim 1 further comprising at least two slots that accept a mounting fork with ends; and a means for fastening the ends.

3. The solar light box of claim 1 further comprising a deep groove, substantially integral to the rain barrier ridge, that accepts a mounting hoop.

4. The solar light box of claim 1 further comprising: an energy-conserving switch; a sensor bracket, attached to the inside of the lower step; and a sensor aperture on the lower step's face such that the energy-conserving switch can be mounted partially inside the lower step.

5. The solar light box of claim 1 wherein the upper step's face contains at least as much surface area as the lower step's face.

6. The solar light box of claim 1 further comprising a tamper-resistant means for securing the solar panel to the solar light box.

7. The solar light box of claim 1 further comprising small holes in the lower step for displaying light emitting diodes.

8. The solar light box of claim 1 further comprising a aperture for mounting a camera to the lower step.

9. An outdoor solar powered light assembly that uses a solar panel as a protective lid comprising:

a solar light box having an upper step and a lower step, each step having a face and sides, the upper step at least partially framing the lower step;

at least one aperture in the lower step's face for mounting a light source;

a deep cavity in the lower step that is substantially defined by the lower step's face and sides;

a rain barrier ridge, substantially around an opening to the lower step's deep cavity, that is formed where the lower step's sides extend above a plane defined by the upper step's face;

a rechargeable battery;

a solar panel, substantially lying between the upper step's sides, and covering the lower step's deep cavity;

a charge controller that is electrically connected between the solar panel and the rechargeable battery;

a sensor bracket attached to the inside of the lower step;

a sensor aperture through the lower step;

an energy-conserving switch, electrically connected between the rechargeable battery and the light source, mounted to the sensor bracket and at least partially in the sensor aperture;

a means for securing the solar panel to the solar light box; and a means for supporting the outdoor solar powered light assembly.

10. The outdoor solar powered light assembly of claim 9 wherein the light source is an array of white light emitting diodes.

11. The outdoor solar powered light assembly of claim 9 wherein the means for supporting the outdoor solar powered light assembly is a light pole mounted to the lower step of the solar light box.

12. The outdoor solar powered light assembly of claim 11 wherein the rechargeable battery is stored in a location that is remote from the solar light box, and wherein the rechargeable battery is electrically connected to the charge controller and the energy-conserving switch by wiring that at least partially passes through the interior of the light pole.

13. The outdoor solar powered light assembly of claim 9 wherein the rechargeable battery is stored in the deep cavity.

14. The outdoor solar powered light assembly of claim 9 wherein the means for securing the solar panel is at least one tamper-resistant fastener.

15. The outdoor solar powered light assembly of claim 9 further comprising at least one hinge for attaching a side of the solar panel to the solar light box such that the solar panel is capable of being lifted to expose the contents of the solar light box without completely removing the solar panel.

16. The outdoor solar powered light assembly of claim 9 further comprising: a camera aperture in the lower step; and a camera mounted at least partially in the camera aperture.

* * * * *